May 22, 1945. J. C. TRAVILLA, JR., ET AL 2,376,735
RAILWAY TRUCK
Filed Sept. 25, 1942 3 Sheets-Sheet 3

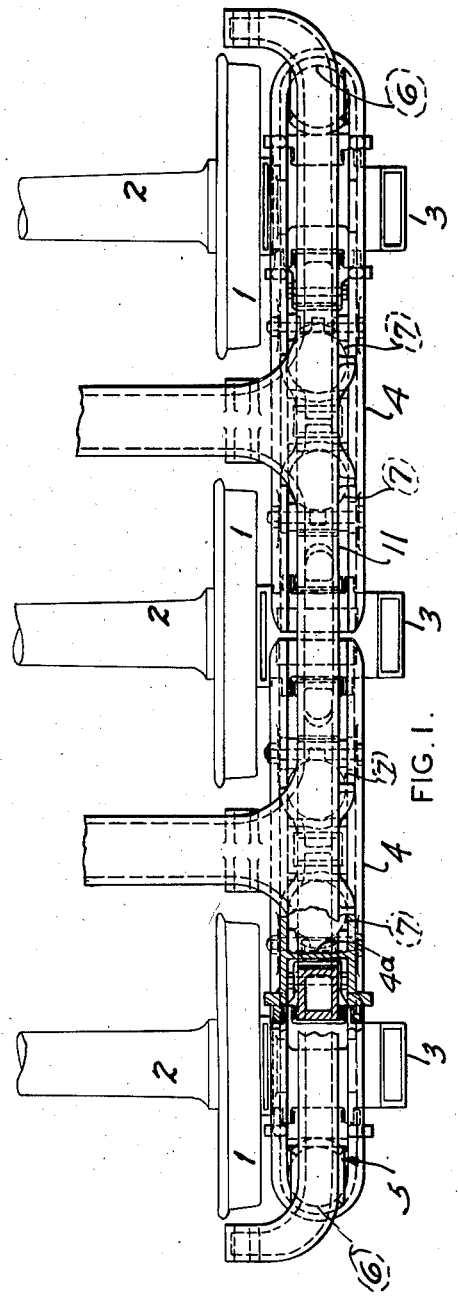
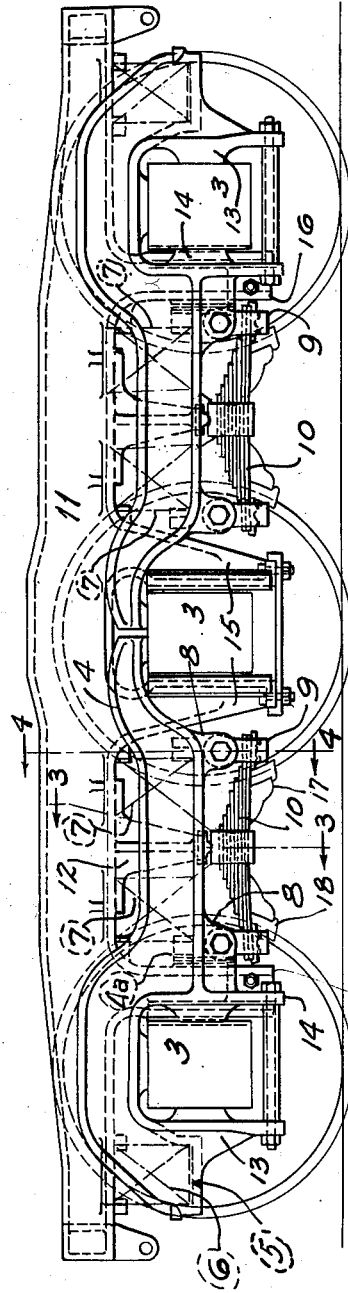

INVENTORS:
JAMES C. TRAVILLA JR
ARTHUR H. PAGENKEMPER
BY Rodney Bedell
ATTORNEY

Patented May 22, 1945

2,376,735

UNITED STATES PATENT OFFICE 2,376,735

RAILWAY TRUCK

James C. Travilla, Jr., Swarthmore, and Arthur H. Pagenkemper, Glenolden, Pa., assignors to General Steel Castings Corporation, Granite City, Ill., a corporation of Delaware Application September 25, 1942, Serial No. 459,678

12 Claims. (Cl. 105—195)

The invention relates to railway rolling stock and more particularly to the spring arrangement in a truck for supporting the truck frame on the wheeled axles.

The main objects of the invention are to provide an easier riding truck by combining coil springs and elliptic springs, to distribute the points of support of the truck frame over a greater extent longitudinally of the truck than is customary, to simplify and lighten the truck frame, and to facilitate access to portions of the brake gear from the side of the truck.

These and other detailed objects as will appear below are attained by the structures illustrated in the accompanying drawings in which—

Figure 1 is a longitudinal half plan view of a six-wheel truck.

Figure 2 is a side elevation of the same.

Figure 3:
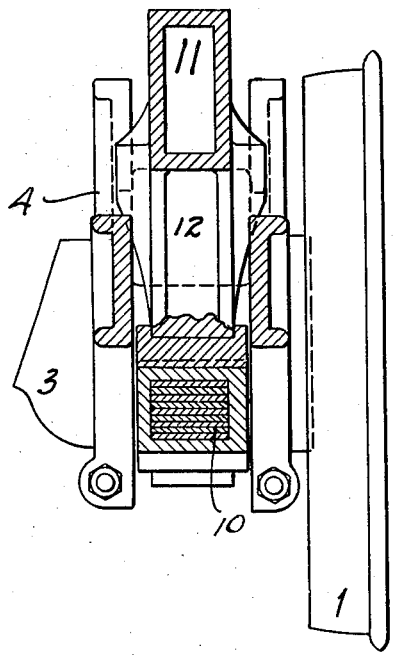
Figures 3 and 4 are vertical transverse sections taken on the corresponding section lines of Figure 2.
Figure 4:
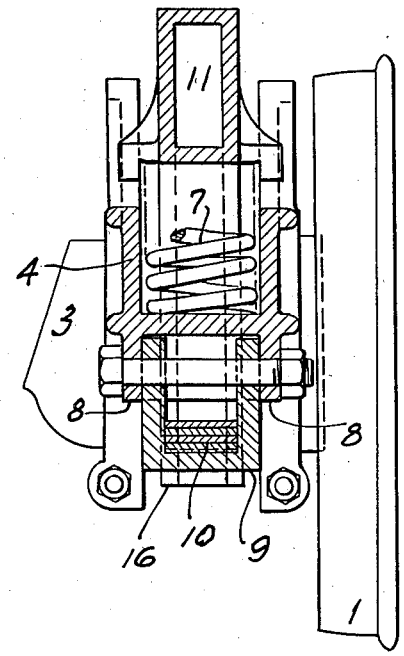

The truck shown in Figures 1–4 includes the usual wheels 1 fixed on axles 2 which support journal boxes 3. Extending between and resting upon the middle journal box at one side of the truck and one of the end journal boxes at the same side of the truck is an equalizer 4 of U-shaped cross section and preferably the outer end of this equalizer extends over and beyond the end journal box terminating in an upwardly opening pocket 5. The portion of the equalizer between the supporting boxes forms another upwardly opening pocket.

A coil spring 6 is seated in pocket 5 and a plurality of coil springs 7 are received in the intermediate pocket. Pairs of lugs 8 depend from the intermediate portion of equalizers 4 and a U-shaped hanger 9 is suspended from each pair of lugs 8. A leaf spring 10 disposed lengthwise of the truck beneath equalizer 4 is supported at its ends upon hangers 9. The truck main frame includes a wheel piece 11 extending lengthwise of the truck over all of the journal boxes and is supported directly on coil springs 6 and 7 and is provided with a depending bracket 12 extending between springs 7 and resting upon the middle portion of leaf spring 10.

Springs 7 and the supporting hangers for spring 10 are disposed between the points of support of the equalizer and therefore the weight of the truck frame and its load transmitted by springs 7 and 10 is distributed to the adjacent axles. However, the weight transmitted by spring 6 is applied to the end axle and the locations and capacities of springs 6, 7 and 10 may be so arranged that the load on each of the three axles is the same as the load on each of the other two axles.

Depending from each equalizer 4 is a pair of legs 13 and 14 receiving the corresponding journal box between them so that the box can easily be removed or applied and holding the box and equalizer against relative movement longitudinally of the truck. Depending from the intermediate portion of each wheel piece 11 are integral legs 15 extending downwardly between the sides of the adjacent end portions of the equalizers and receiving between them the middle journal box and holding the frame and middle axle with its boxes against relative movement longitudinally and transversely of the truck. The wheel piece also has depending legs 16 each opposing the inner face of an end journal box and extending downwardly between the sides of the corresponding equalizer end portion and an opposing element 4a on the equalizer facing towards the journal box.

Legs, 13, 14, 15, 16 and elements 4a cooperate to hold the frame, equalizers and journal boxes against substantial relative movement longitudinally and transversely of the truck.

The substantial height of the equalizer above the rail facilitates inspection of and access to the brake heads 17 and shoes 18 and the lower ends of the brake beam hangers 19. The distribution of the load to the springs at numerous points longitudinally of the truck reduces the required capacity of each spring unit, and the combination of the leaf springs and the coil springs provides for the quick absorbing of light shocks and adequate snubbing of rebound movements, thus promoting the easy riding qualities of the truck.

Figure 5:
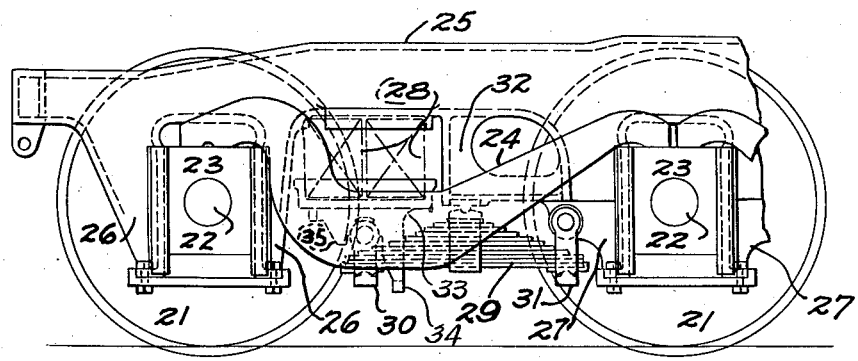
Figure 5 is a side elevation of one-half of a six-wheel truck illustrating another form of the invention.

Figure 5 illustrates another form of the invention in which the wheels 21, axles 22 and journal boxes 23 correspond to those previously described, but the equalizer structure 24 is of the double forged type with a separately formed spring seat between the parallel equalizer bars. The equalizer structure terminates over the end journal boxes and does not include any depending legs engaging the sides of the journal boxes.

The boxes, axles and wheels are positioned longitudinally of the truck exclusively by the truck frame, the wheel piece 25 of which is provided with depending legs 26 and 27 at the sides of the journal boxes.

Since the equalizer does not extend beyond the end journal box and there support the frame, it is necessary to distribute the load to the equalizer at points disposed symmetrically of the journal boxes. This is effected by supporting the unit of coil springs 28 on the equalizer at a point nearer to the end journal box than to the middle journal box, thus transmitting to the end journal box a greater portion of the weight of the frame and its load transmitted by springs 28.

A leaf spring 29 is supported at one end by a hanger 30 suspended from the equalizer beneath the coil spring unit 28 and is supported at its opposite end by a hanger 31 suspended from the adjacent box-engaging leg 27 of the truck frame. The frame includes a bracket 32 extending between equalizers 24 and supported on the intermediate portion of the leaf spring similarly to the bracket 12 in the form of the invention described above.

The coil spring unit is provided with a seat member 33 resting upon the parallel equalizers 24 and having a yoke-like portion 34 depending between equalizers 24 and enclosing the leaf spring and acting as a safety guard for resisting the dropping of the spring to the rail. A lug 35 depends from seat member 33 and cooperates with portion 34 to form a recess receiving between them the upper ends of the leaf spring hanger 30, thereby positioning the spring seat longitudinally of the truck.

With this arrangement the usual truck frame, journal box and pedestal structure is retained and the simpler form of drop equalizer is used to carry the truck springs. The structure retains the advantages of a coil spring unit for supporting the truck frame from the equalizer at a point nearer the end journal box than the middle journal box and also retains the advantage of supporting the truck frame at the middle of a leaf spring, one end of which is supported by the equalizer at a point relatively close to the end journal boxes.

Figure 6:
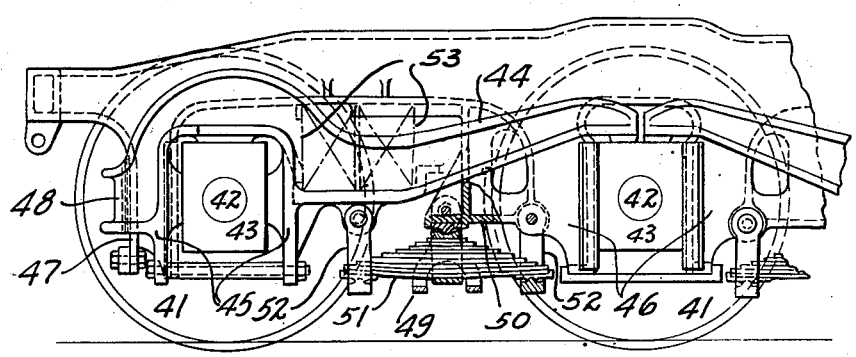
Figures 6 and 7 are similar to Figure 5 but illustrate respectively other forms of the invention.

Figure 6 illustrates another form of the invention in which the wheels 41, axles 42 and journal boxes 43 correspond to those previously described. The equalizer structure 44 corresponds generally to that shown in Figure 2 in that it has depending legs 45 receiving the end journal box between them and holding the box and equalizer against relative movement longitudinally of the truck but providing for the ready assembly and disassembly of the box and equalizer. The truck frame has depending legs 46 receiving between them the middle journal box and also has a depending leg 47 near each end arranged to oppose the outer face of the corresponding end journal box and extending downwardly between the sides of the corresponding equalizer end portion and inwardly of the end element 48 of the equalizer.

A yoke-like safety strap 49 is suspended from the frame bracket portion 50 which rests upon the leaf spring 51, and this strap extends around the central portion of the leaf spring to prevent this from dropping in the event of failure of the spring or its hangers 52.

With this arrangement, the equalizer coil springs 53 can be located close to the end journal box to obtain the desired distribution of the loads on the boxes without any undue cramping of the space for a pedestal leg inwardly of the box, as in Figure 2.

Figure 7:
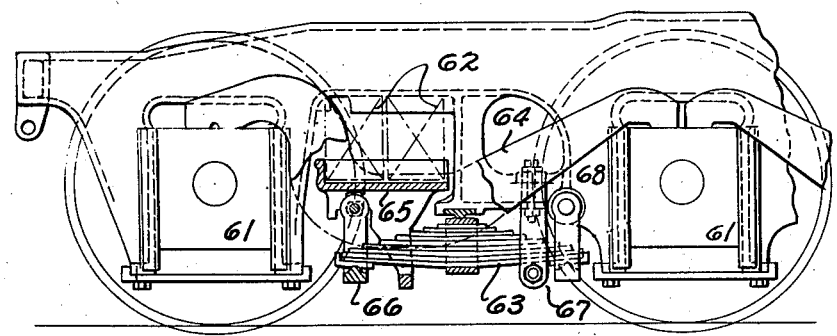

Figure 7 illustrates another form of the invention closely resembling that shown in Figure 5 but in which the journal boxes 61 are arranged for roller bearings (not shown), as well known in the art. Such boxes are substantially wider than the usual friction bearing boxes, as shown in Figures 1–6, and this necessitates spacing of the coil spring unit 62 nearer to the middle journal box than in the arrangement shown in Figure 5. With this arrangement, the end of the leaf spring unit 63 and the corresponding hangers 66 are located closer to the journal than the corresponding structure in Figure 5. This is necessary for equal distribution of the loads on all axles. The coil spring seat 65 corresponds to that shown in Figure 5 but the recess fitting over leaf spring hanger 66 is offset from the center of the seat to accommodate the shifting of the coil spring unit relative to the hanger of the leaf spring unit.

A safety strap 67 is secured to the truck frame portion 68 immediately above the right hand portion of the leaf spring and functions similarly to the safety strap 49 shown in Figure 6, cooperating with the yoke portion of spring seat 65 to hold the leaf spring against dropping to the rail in the event of its failure or failure of its hangers.

In six-wheel trucks, the spring loads should be applied to the equalizer at a point one-third the distance from the end axle to the center axle, and in the arrangement shown in Figure 7 the coil springs are located inwardly of this point to accommodate a wider journal box and inner pedestal leg while the hanger for supporting the end of the leaf spring is located closer to the journal than in structure such as shown in Figure 5 as there is sufficient space to do so without interfering with the lower portion of the adjacent pedestal. The combined load of the coil spring and leaf spring, however, will be concentrated at a point on the equalizer one-third of the distance between the end axle and the center axle.

Figure 8:
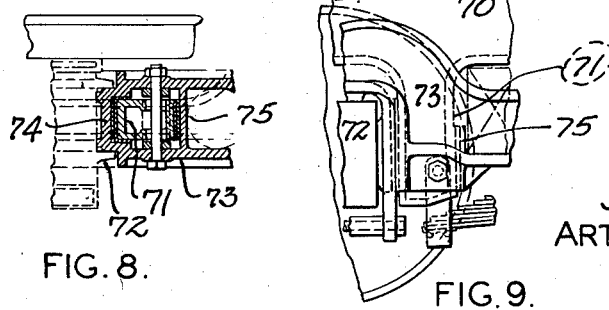
Figures 8 and 9 are detail horizontal and vertical sections corresponding to portions of Figures 1 and 2 but illustrating another modification.
Figure 9:
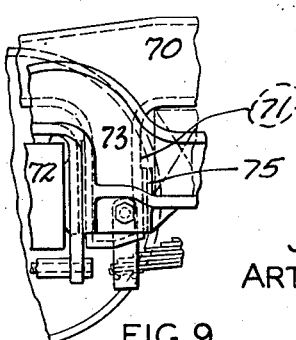

The modification illustrated in Figures 8 and 9 corresponds generally to that shown in Figures 1 and 2 but the truck frame 70 has its end depending leg 71 at the inner side of the end journal box 72 spaced from the box. The adjacent upright portion of the equalizer 73 includes a cross bar 74 positioned between the box and frame leg 71 and cooperating with the upstanding element 75 (corresponding to the element 4a in Figures 1 and 2) to guide the frame in its vertical movement due to the action of the supporting springs and to position the equalizer and journal box longitudinally of the truck relative to the frame.

While the invention is illustrated as applied to a six-wheel truck, it will be understood that some of the features are not necessarily limited to use in a six-wheel truck but may be applied to any plural axle truck. All of the details of the construction may be varied without departing from the spirit of the invention, and the exclusive use of those modifications coming within the scope of the claims is contemplated.

What is claimed is:

1. In a railway truck, three wheeled axles with journal boxes, an equalizer resting on and extending between a journal box on an end axle and a journal box on a middle axle at the same side of the truck, a truck frame, springs supporting said frame and comprising a leaf spring, disposed longitudinally of the truck with at least one of its ends supported from said equalizer, at a point spaced longitudinally of the truck a substantial distance from the journal boxes and with its intermediate portion supporting said frame and a coil spring spaced longitudinally of the truck from adjacent journal boxes and supported from said equalizer independently of said leaf spring and supporting the frame at a different point than said leaf spring, said springs and equalizer distributing substantially two-thirds of their load on said end journal box and one-third of their load on the middle journal box.

2. In a railway truck, three wheeled axles with journal boxes, an equalizer extending between each journal box on an end axle and the adjacent journal box on the middle axle, a leaf spring extending lengthwise of the truck beneath each equalizer and having at least one end suspended from the equalizer, coil springs arranged side by side longitudinally of the truck on each equalizer above the corresponding leaf spring and nearer to the end axle than to the central axle, and a truck main frame supported by said springs, said frame, springs and equalizers distributing the truck load equally to the three axles.

3. In a railway truck, three wheeled axles with journal boxes, equalizer structure extending between journal boxes at the same side of the truck and beyond one of the end journal boxes towards the adjacent end of the truck, coil springs mounted on said equalizer structure at opposite sides of said box longitudinally of the truck, a truck load carrying frame supported on said springs, and a leaf spring extending lengthwise of the truck and suspended from said equalizer structure and supporting said frame, said equalizer structure distributing the entire load on said springs to all the axles in substantially equal proportions.

4. In a railway truck, wheeled axles with journal boxes, equalizer structure extending between journal boxes at the same side of the truck and beyond one of said journal boxes towards the adjacent end of the truck, a coil spring mounted on said equalizer structure between said box and the end of the truck, coil springs mounted on said equalizer structure between said boxes and spaced apart longitudinally of the truck, a leaf spring extending lengthwise of the truck beneath said equalizer structure and said latter-mentioned coil springs and suspended at its ends from said equalizer structure, and a truck load carrying frame mounted on said coil springs and provided with a depending bracket extending between said latter-mentioned coil springs and through said equalizer structure and supported upon the intermediate portion of said leaf spring.

5. In a railway truck, three wheeled axles with journal boxes, equalizer structure extending between each journal box on the middle axle and the adjacent journal box on an end axle and including a portion extending beyond the latter box towards the corresponding end of the truck, a coil spring unit supported on each equalizer structure substantially symmetrically to the points of support of the equalizer structure, a truck frame supported on said units, a leaf spring beneath each equalizer structure and supported at its ends from the equalizer structure symmetrically to the points of support of the equalizer structure and, intermediate its ends, supporting said truck frame, and a coil spring supported on the outwardly extending portion of each equalizer structure and supporting the truck frame, whereby the truck frame and its load is supported equally on the three axles.

6. In a railway truck, wheeled axles with journal boxes, an equalizer structure having spaced side members extending between and carried by adjacent journal boxes at the same side of the truck, a truck load carrying frame including a wheel piece extending over said equalizer, a coil spring unit mounted on said equalizer and supporting said truck frame, a leaf spring unit extending longitudinally of the truck with one end supported from said equalizer and with its other end supported from said frame, there being a bracket on said wheel piece extending downwardly between the spaced members of said equalizer structure and resting on said leaf spring unit between the ends of the latter and supporting said frame.

7. In a railway truck, three wheeled axles with journal boxes, equalizer structure extending between and carried by a journal box on the middle axle and journal boxes at the same side of the truck on the end axles, a truck load carrying frame including a wheel piece extending over said equalizer structure, coil spring units supported by the equalizer structure at points nearer to the end axle journal boxes than to the middle axle journal box, leaf spring units associated with the equalizer structure and extending longitudinally of the truck and each having one end supported from the equalizer structure beneath the corresponding coil spring unit and having its other end supported from said frame at a point adjacent the middle axle journal box, said spring units supporting said frame and cooperating with said equalizer structure to distribute the truck load equally to the three axles.

8. In a railway truck, three wheeled axles with journal boxes, equalizers each having an inner end portion carried on one of the middle journal boxes and having an outer end portion carried on an end journal box at the same side of the truck and provided with depending brackets receiving between them the associated end journal box, and a truck main frame spring-supported from said equalizers and having depending legs at each side of the truck and receiving between them one of the middle journal boxes and also having depending legs each opposing one side of a respective one of said end journal boxes and an oppositely facing portion of the corresponding equalizer, whereby the frame, equalizers, and journal boxes and wheeled axles are held against substantial relative movement longitudinally of the truck.

9. In a railway truck, three wheeled axles with journal boxes, an equalizer having an inner end portion carried on one middle journal box and having an outer end portion carried on the adjacent end journal box at the same side of the truck and extending beyond said end journal box towards the end of the truck, said equalizer having elements engaging said end journal box to hold them against movement longitudinally of the truck relative to each other, whereby said equalizer and end journal box form a substantially rigid unit, and a truck main frame having spring supports on said equalizer at opposite sides of the box longitudinally of the truck and having a depending leg between the end journal box and the adjacent spring support, and there being a vertical recess in said unit to receive said leg, whereby said unit is held against substantial movement longitudinally of the truck relative to the truck frame.

10. In a railway truck, wheeled axles with journal boxes, an equalizer extending between and carried by journal boxes at the same side of the truck, a truck load carrying frame including a wheel piece extending over said equalizer, a coil spring unit mounted on said equalizer and supporting said truck frame, a leaf spring unit extending longitudinally of the truck and supporting said truck frame at a point intermediate its ends, said leaf spring being supported from said equalizer at one of its ends and from said frame at its other end, there being a downwardly extending element on said frame adjacent to its support on said leaf spring and extending below said leaf spring to prevent the spring from dropping in the event of spring breakage.

11. In a railway truck, three wheeled axles with journal boxes, equalizers of U-shaped cross section extending between adjacent journal boxes at the same side of the truck and longitudinally of the truck beyond the end journal box, a leaf spring disposed longitudinally of the truck between adjacent journal boxes with at least one of its ends supported from the associated equalizer, coil springs received between the legs of said equalizer and supported upon the cross bar of said equalizer independently of the leaf spring and at points spaced longitudinally of the truck from opposite sides of the journal boxes, and a truck load carrying frame having an individual bearing on each of said springs, said equalizer distributing the entire load on said springs to all the axles in substantially equal proportions.

12. In a railway truck, three wheeled axles with journal boxes, equalizers extending between adjacent journal boxes at the same side of the truck and beyond the journal boxes nearest the end of the truck, a leaf spring disposed longitudinally of the truck beneath each equalizer with its ends suspended therefrom, a coil spring unit supported from each equalizer independently of the associated leaf spring and intermediate the boxes supporting the associated equalizer, and a truck load carrying frame including a wheel piece resting upon said coil springs and provided with depending brackets supported upon the leaf springs intermediate the boxes, and spring means adjacent the end portions of the truck frame and supporting it from the equalizers outwardly of the end journal boxes.

JAMES C. TRAVILLA, Jr.
ARTHUR H. PAGENKEMPER.